Patented July 13, 1943

2,324,369

UNITED STATES PATENT OFFICE 2,324,369

DIAZINE DERIVATIVES

Gaetano F. D'Alelio and James W. Underwood, Pittsfield, Mass., assignors to General Electric Company, a corporation of New York No Drawing. Application March 26, 1942, Serial No. 436,249

12 Claims. (Cl. 260—251)

This invention relates to new chemical compounds and more particularly to diazine derivatives. The invention especially is concerned with the production of new and useful bis-(diamino diazinyl) cyanoalkylene (including cyanoalkylidene) disulfides.

The diazine derivatives of this invention may be represented by the following general formula:

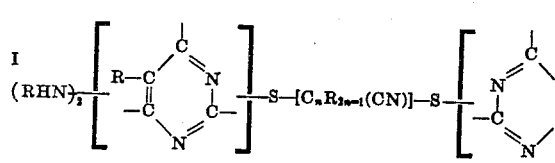

In the above formula $n$ represents an integer and is at least 1 and not more than 2 and R represents a member of the class consisting of hydrogen and monovalent hydrocarbon and substituted hydrocarbon radicals, more particularly halo-hydrocarbon radicals.

Illustrative examples of radicals that R in Formula I may represent are: aliphatic (e. g., methyl, ethyl, propyl, isopropyl, butyl, secondary butyl, isobutyl, butenyl, amyl, isoamyl, hexyl, etc.), including cycloaliphatic (e. g., cyclopentyl, cylcopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, bromotolyl, iodophenyl, etc. However, there also may be produced in accordance with the present invention compounds such, for instance, as those represented by the general formulas:

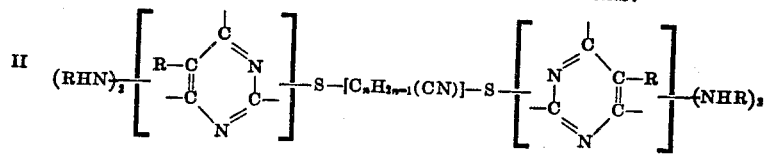

and, more particularly,

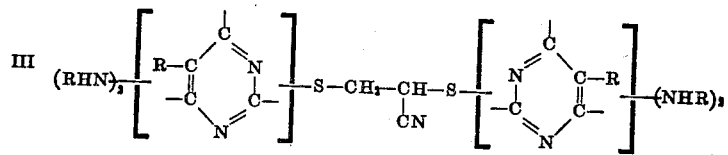

where $n$ and R have the same meanings as above given with reference to Formula I.

The new compounds of this invention may be used, for example, as pharmaceuticals, plasticizers, fungicides, insecticides, as an intermediate in the preparation of dyes and other chemical compounds, for instance as an intermediate in producing derivatives thereof such as ureido, hydrazino, carbamyl, amidine, methylol, etc., derivatives. These new compounds are especially valuable in the preparation of synthetic resinous compositions. Thus, they may be condensed with, for example, aldehydes, including polymeric aldehydes, hydroxy aldehydes and aldehyde-addition products, to yield condensation products of particular utility in the plastics and coating arts. Such condensation products are more fully described and are specifically claimed in our copending application Serial No. 436,248, filed concurrently herewith and assigned to the same assignee as the present invention. These new compounds also may be compounded with rubber, both natural and synthetic, to modify the properties of the rubber.

Various methods may be employed to produce the chemical compounds of this invention. We prefer to prepare them by effecting reaction between a diamino [(—NHR)₂] mercapto pyrimidine and a di-halogenated alkyl cyanide (di-halogenated cyano-alkane) in the presence of a hydro-halide acceptor, the reactants being employed in the ratio of two mols of the diamino mercapto pyrimidine per mol of the di-halogenated alkyl cyanide.

Illustrative examples of mercapto diamino pyrimidines that may be used, depending upon the particular end-product desired, are:

2-mercapto 4,6-diamino pyrimidine
2-mercapto 4-bromotoluido 6-benzylamino pyrimidine
2-mercapto 4-phenylchloroethylamino 6-phenethylamino pyrimidine
2-mercapto 4-chloroanilino 5-methyl 6-ethylphenylamino pyrimidine
2-mercapto 4-cycloheptylamino 6-isopropylphenylamino pyrimidine
2-mercapto 4,6-diamino 5-methyl pyrimidine
2-mercapto 4,6-di-(methylamino) pyrimidine
2-mercapto 4,6-di-(methylamino) 5-methyl pyrimidine
2-mercapto 4-chloroethylamino 6-methylamino pyrimidine
2-mercapto 4,6-di-(anilino) pyrimidine
2-mercapto 4,6-di-(anilino) 5-butyl pyrimidine
2-mercapto 4-xenylamino 5-cyclopentyl 6-amylamino pyrimidine
2-mercapto 4-amino 6-ethylamino pyrimidine
2-toluido 4-mercapto 5-cyclohexenyl 6-amino pyrimidine (2-toluido 4-amino 5-cyclohexenyl 6-mercapto pyrimidine)
2-mercapto 4,6-di-(propylamino) pyrimidine
2-allylamino 4-mercapto 5-phenyl 6-amino pyrimidine
2-isoamylamino 4-mercapto 6-chloroanilino pyrimidine
2-dichloroanilino 4-mercapto 5-tolyl 6-propylamino pyrimidine
2-cycloheptylamino 4-mercapto 6-isobutylamino pyrimidine
2-mercapto 4-allylamino 6-butylamino pyrimidine
2-mercapto 4-isobutylamino 6-cyclopentylamino pyrimidine
2-mercapto 4-(3'-butenylamino) 6-isopropylamino pyrimidine Typical examples of di-halogenated alkyl cyanides (di-halogenated alkyl nitriles) that may be employed, depending upon the particular end-product sought, are:

Alpha, alpha-dichloro propionitrile
Beta, beta-dichloro propionitrile
Alpha, beta-dibromo propionitrile
Alpha, alpha-diiodo butyronitrile
Alpha, beta-dibromo valeronitrile
Beta, beta-dichloro butyronitrile
Alpha, alpha-diiodo beta-methyl butyronitrile
Alpha, beta-dichloro alpha, beta-dimethyl butyronitrile
Alpha, beta-dibromo alpha-methyl beta-benzyl capronitrile
Alpha, beta-diiodo alpha-cyclohexyl beta-tolyl butyronitrile
Alpha, alpha-dichloro beta, beta-diphenyl valeronitrile
Alpha-chloro alpha-iodo acetonitrile
Alpha-chloro beta-bromo alpha-naphthyl beta-xylyl butyronitrile
Dichloroacetonitrile
Dibromoacetonitrile
Diiodoacetonitrile
Alpha, beta-dibromo beta-methyl gamma-phenyl valeronitrile Various hydrohalide acceptors may be employed. We prefer to use a hydrohalide acceptor that will react with the mercapto pyrimidine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino pyrimidine and the di-halogenated alkyl nitrile may be carried out in any suitable manner, but preferably is effected in the presence of a suitable solvent or mixture of solvents. Although various solvents and solvent mixtures may be employed, we prefer to use water or a mixture of water and alcohol. The reaction may be carried out under a variety of temperature and pressure conditions, for instance at normal, sub-normal or at elevated temperatures and at atmospheric, sub-atmospheric or super-atmospheric pressures.

The above reaction may be represented by the following general equation:

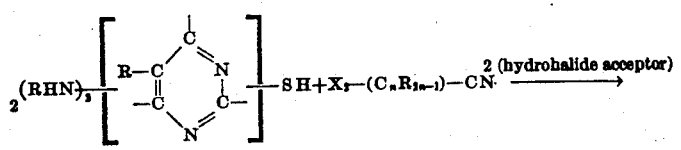

IV

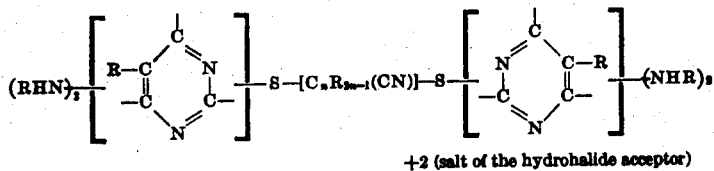

+2 (salt of the hydrohalide acceptor)

In the above equation X represents halogen and $n$ and R have the same meanings as given above with reference to Formula I.

In order that those skilled in the art better may understand how the present invention may be carried into effect, the following illustrative examples are given. All parts are by weight.

Example 1

This example illustrates the preparation of alpha, beta-bis-(4,6-diamino pyrimidyl-2) cyanoethylene disulfide, the formula for which is

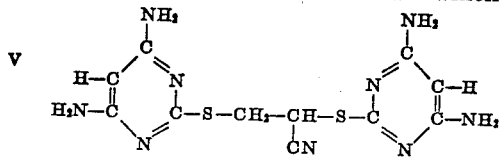

| | Parts (approximately) |
|---|---|
| 4,6-diamino 2-mercapto pyrimidine | 142 |
| Alpha, beta-dichloropropionitrile | 63 |
| Sodium hydroxide | 40 |
| Alcohol | 50 |
| Water | 50 |

The sodium hydroxide and the 4,6-diamino pyrimidine were dissolved in the mixture of water and alcohol. The alpha, beta-dichloropropionitrile was now added and the reaction was allowed to proceed at room temperature for about 90 hours. The reaction mass was then heated under reflux at the boiling temperature of the mass for 1 hour. The mass was stirred during the heating period. After cooling to room temperature the product, alpha, beta-bis-(4,6-diamino pyrimidyl-2) cyanoethylene disulfide, which had precipitated from the mass, was filtered from the mother liquor and well washed with water. No attempt was made to recover any more product from the mother liquor. A yield of 131 parts of the dried and purified product was obtained.

Example 2

Alpha, beta-bis-(2,6-diamino pyrimidyl-4) cyanoethylene disulfide, which also may be named alpha, beta-bis-(2,4-diamino pyrimidyl-6) cyanoethylene disulfide, is prepared in essentially the same manner as described under Example 1 with the exception that 142 parts of 2,6-diamino 4-mercapto pyrimidine is used intead of 142 parts of 4,6-diamino 2-mercapto pyrimidine.

Example 3

A bis-(diamino pyrimidyl) cyanomethylene disulfide, specifically bis-(4,6-diamino pyrimidyl-2) cyanomethylene disulfide, is produced in essentially the same manner as described under Example 1 with the exception that, instead of alpha, beta-dichloropropionitrile, an equivalent amount of dichloroacetonitrile is used.

Example 4

Alpha, beta-bis-[4,6-di-(methylamino) pyrimidyl-2] cyanoethylene disulfide is prepared in essentially the same manner as described under Example 1 with the exception that, instead of 4,6-diamino 2-mercapto pyrimidine, an equivalent amount of 4,6-di-(methylamino) 2-mercapto pyrimidine is employed.

Other examples of the new chemical compounds of this invention are listed below:

Bis-(2,6-diamino pyrimidyl-4) cyanomethylene disulfide
Beta, beta-bis-(4,6-diamino pyrimidyl-2) cyanoethylidene disulfide
Beta, beta-bis-(2,6-diamino pyrimidyl-4) cyanoethylidene disulfide
Bis-(4-amino 6-methylamino pyrimidyl-2) cyanomethylene disulfide
Bis-[4,6-di-(methylamino) pyrimidyl-2] cyanomethylene disulfide
Alpha, alpha-bis-(4,6-diamino pyrimidyl-2) cyanoethylidene disulfide
Alpha, alpha-bis-(2,6-diamino pyrimidyl-4) cyanoethylidene disulfide
Beta-phenyl alpha, alpha-bis-(4-pentylamino 5-methyl 6-ethylamino pyrimidyl-2) cyanoethylidene disulfide
Beta, beta-bis-(4,6-diamino pyrimidyl-2) cyanopropylidene disulfide
Beta, beta-bis-(2,6-diamino pyrimidyl-4) cyanopropylidene disulfide
Alpha, beta-bis-(4,6-diamino pyrimidyl-2) cyanopropylene disulfide
Alpha, beta-bis-(2,6-diamino pyrimidyl-4) cyanopropylene disulfide
Alpha-methyl beta, beta-bis-(4,6-dianilino 5-phenyl pyrimidyl-2) cyanopropylidene disulfide
Alpha, beta-dimethyl alpha, beta-bis-(4-xylidino 5-benzyl 6-amino pyrimidyl-2) cyanopropylene disulfide
Alpha-butyl alpha, beta-bis-(2-amino 5-cyclohexyl 6-naphthylamino pyrimidyl-4) cyanoethylene disulfide
Alpha-cyclopentyl beta-phenyl alpha, beta-bis-(2-methylamino 5-naphthyl 6-isopropylamino pyrimidyl-4) cyanoethylene disulfide
Alpha, beta-di-(chlorophenyl) alpha, beta-bis-(diamino pyrimidyl) cyanoethylene disulfide
Beta-benzyl alpha, alpha-bis-(2,6-diamino 5-xylyl pyrimidyl-4) cyanopropylidene disulfide
Tolyl bis-(4-anilino 6-methylamino pyrimidyl-2) cyanomethylene disulfide
Phenyl bis-(diamino pyrimidyl) cyanomethylene disulfide.
Chlorophenyl bis-(diamino pyrimidyl) cyanomethylene disulfide
Bromotolyl bis-(diamino pyrimidyl) cyanomethylene disulfide
Iodophenyl bis-(diamino pyrimidyl) cyanomethylene disulfide
Alpha-benzyl alpha, beta-bis-(4,6-diamino 5-methyl pyrimidyl-2) cyanoethylene disulfide
Alpha-butyl alpha, beta-bis-(2,6-diamino 5-methyl pyrimidyl-4) cyanoethylene disulfide
Alpha, beta-dimethyl alpha, beta-bis-(4-cyclopentylamino 5-methyl 6-toluido pyrimidyl-2) cyanoethylene disulfide
Alpha, beta-diethyl alpha, beta-bis-(2-fluoroanilino 5-tolyl 6-toluido pyrimidyl-4) cyanoethylene disulfide
Alpha-methyl alpha, beta-bis-(4-benzylamino 5-chlorophenyl 6-amino pyrimidyl-2) cyanoethylene disulfide
Alpha, beta-dipropyl alpha, beta-bis-(4-iodoanilino 6-toluido pyrimidyl-2) cyanoethylene disulfide
Beta-phenyl alpha, beta-bis-[2,6-di-(methylamino) 5-cyclohexyl pyrimidyl-4] cyanoethylene disulfide
Beta-phenyl alpha, beta-bis-(diamino pyrimidyl) cyanoethylene disulfide
Beta-tolyl alpha, beta-bis-(diamino pyrimidyl) cyanoethylene disulfide
Beta-cyclohexyl alpha, beta-bis-(diamino pyrimidyl) cyanoethylene disulfide
Beta-cyclohexenyl alpha, beta-bis-(diamino pyrimidyl) cyanoethylene disulfide
Alpha-(2-butenylphenyl) alpha, beta-bis-(diaminopyrimidyl) cyanoethylene disulfide
Bis-[di-(naphthylamino) pyrimidyl cyanomethylene disulfide
Alpha, beta-bis-[4,6-di-(allylamino) pyrimidyl-2] cyanoethylene disulfide Alpha, beta-bis-[4,6-di-(bromoethylamino) pyrimidyl-2] cyanoethylene disulfide
Bis-(2-amino 6-ethylamino pyrimidyl-4) cyanomethylene disulfide Beta-tolyl alpha, alpha-bis-(diamino pyrimidyl) cyanoethylidene disulfide
Alpha, beta-bis-(diamino pyrimidyl) cyanobutylene disulfide
Alpha, alpha-bis-(diamino pyrimidyl) cyanobutylidene disulfide
Beta, beta-bis-(diamino pyrimidyl) cyanobutylidene disulfide
Alpha, beta-bis-(diamino pyrimidyl) cyanopentylene disulfide
Alpha, beta-bis-(diamino pyrimidyl) cyanohexylene disulfide
Alpha, beta-bis-(diamino pyrimidyl) cyanoheptylene disulfide It will be understood, of course, by those skilled in the art that "diamino pyrimidyl" as used broadly in naming some of the above-mentioned compounds includes within its meaning both the bis-(4,6-diamino pyrimidyl-2) and the bis-(2,6-diamino pyrimidyl-4) [bis-(2,4-diamino pyrimidyl-6)] compounds.

In a manner similar to that described above with particular reference to the production of bis-(diamino pyrimidyl) cyanoalkylene disulfides, which also may be named bis-(diamino 1,3-diazinyl) cyanoalkylene disulfides, corresponding derivatives of the 1,2-diazines and of the 1,4-diazines may be prepared.

What we claim as new and desire to secure by Letters Patent of the United States is:

1. Chemical compounds corresponding to the general formula

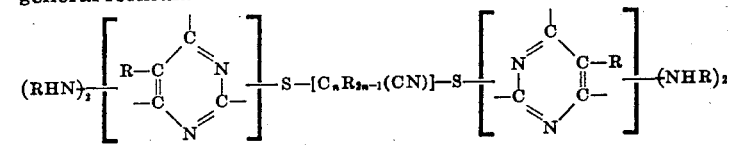

where $n$ is an integer and is at least 1 and not more than 2, and R represents a member of the class consisting of hydrogen and monovalent hydrocarbon and halo-hydrocarbon radicals.

2. Chemical compounds as in claim 1 wherein R represents hydrogen.

3. Chemical compounds as in claim 1 wherein $n$ is 1.

4. Chemical compounds corresponding to the general formula

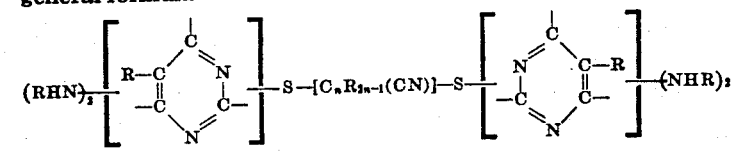

where $n$ is an integer and is at least 1, and not more than 2, and R represents a member of the class consisting of hydrogen and monovalent hydrocarbon and halo-hydrocarbon radicals.

5. Chemical compounds corresponding to the general formula

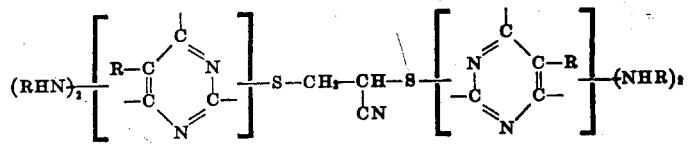

where R represents a member of the class consisting of hydrogen and monovalent hydrocarbon and halo-hydrocarbon radicals.

6. A bis-(diamino pyrimidyl) cyanomethylene disulfide.

7. Bis-(4,6-diamino pyrimidyl-2) cyanomethylene disulfide.

8. A bis-(diamino pyrimidyl) cyanoethylene disulfide.

9. Alpha, beta-bis-(4,6-diamino pyrimidyl-2) cyanoethylene disulfide.

10. The method of preparing chemical compounds corresponding to the general formula

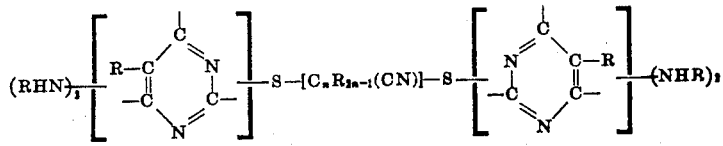

where $n$ is an integer and is at least 1 and not more than 2 and R represents a member of the class consisting of hydrogen and monovalent hydrocarbon and halo-hydrocarbon radicals, said method comprising effecting reaction, in the presence of a hydrohalide acceptor, between (1) a mercapto pyrimidine corresponding to the general formula

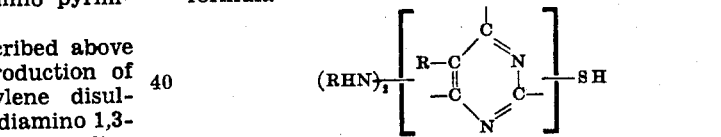

where R has the meaning above given, and (2) a di-halogenated alkyl cyanide corresponding to the general formula $$X_2-(C_nR_{2n-1})-CN$$

where X represents halogen and $n$ and R have the meanings above given, said reactants being employed in the ratio of two mols of the former to one mol of the latter.

11. A method as in claim 10 wherein the hydrohalide acceptor is an alkali-metal hydroxide.

12. The method of preparing alpha, beta-bis (4,6-diamino pyrimidyl-2) cyanoethylene disulfide which comprises effecting reaction, in the presence of a hydrohalide acceptor, between 4,6-diamino 2-mercapto pyrimidine and alpha, beta-dichloropropionitrile in the ratio of two mols of the former to one mol of the latter.

GAETANO F. D'ALELIO.
JAMES W. UNDERWOOD.

CERTIFICATE OF CORRECTION.

Patent No. 2,324,369. July 13, 1943.

GAETANO F. D'ALELIO, ET AL.

It is hereby certified that error appears in the printed specification of the above numbered patent requiring correction as follows: Page 1, first column, line 42, for "cylcopentenyl" read --cyclopentenyl--; page 3, second column, line 70-71, for "diaminopyrimidyl" read --diamino pyrimidyl--; line 72, after "pyrimidyl" insert a bracket; page 4, first column, line 70, in the formula, for "$C_nR_{2n}$" read --$C_nH_{2n}$--; and that the said Letters Patent should be read with this correction therein that the same may conform to the record of the case in the Patent Office.

Signed and sealed this 31st day of August, A. D. 1943.

(Seal)

Henry Van Arsdale,
Acting Commissioner of Patents.